(12) United States Patent
Rajan et al.

(10) Patent No.: US 7,231,306 B1
(45) Date of Patent: Jun. 12, 2007

(54) METHOD AND APPARATUS FOR CALIBRATING STATIC TIMING OFFSETS ACROSS MULTIPLE OUTPUTS

(75) Inventors: Suresh Rajan, San Jose, CA (US); Scott Best, Palo Alto, CA (US)

(73) Assignee: Rambus Inc., Los Altos, CA (US)

( * ) Notice: Subject to any disclaimer, the term of this patent is extended or adjusted under 35 U.S.C. 154(b) by 764 days.

(21) Appl. No.: 10/135,871

(22) Filed: Apr. 30, 2002

(51) Int. Cl.
*G01D 18/00* (2006.01)
(52) U.S. Cl. ....................................... 702/89
(58) Field of Classification Search ................. 702/85, 702/79, 106, 89
See application file for complete search history.

(56) References Cited

U.S. PATENT DOCUMENTS

| | | | | |
|---|---|---|---|---|
| 4,827,437 A | * | 5/1989 | Blanton ....................... | 702/89 |
| 5,122,978 A | * | 6/1992 | Merrill ........................ | 702/79 |
| 5,184,091 A | * | 2/1993 | Srivastava .................... | 331/10 |
| 5,377,202 A | * | 12/1994 | Bryson et al. ............... | 714/740 |
| 5,436,908 A | * | 7/1995 | Fluker et al. ............... | 714/700 |
| 5,659,268 A | * | 8/1997 | Kesner ........................ | 331/1 A |
| 5,668,830 A | * | 9/1997 | Georgiou et al. ........... | 375/220 |
| 5,742,798 A | | 4/1998 | Goldrian | |
| 5,812,619 A | * | 9/1998 | Runaldue .................... | 375/376 |
| 5,828,870 A | * | 10/1998 | Gunadisastra ............... | 713/503 |
| 5,852,640 A | * | 12/1998 | Kliza et al. ................. | 375/356 |
| 5,990,814 A | * | 11/1999 | Croman et al. ............. | 341/118 |
| 6,029,250 A | | 2/2000 | Keeth | |
| 6,047,346 A | * | 4/2000 | Lau et al. ................... | 327/158 |
| 6,070,222 A | * | 5/2000 | Farmwald et al. .......... | 711/105 |
| 6,172,571 B1 | * | 1/2001 | Moyal et al. ................ | 331/11 |
| 6,175,254 B1 | * | 1/2001 | Corio ........................... | 327/94 |
| 6,219,384 B1 | * | 4/2001 | Kliza et al. ................. | 375/258 |
| 6,321,282 B1 | | 11/2001 | Horowitz et al. | |
| 6,442,644 B1 | | 8/2002 | Gustavson et al. | |
| 6,463,109 B1 | * | 10/2002 | McCormack et al. ....... | 375/355 |

(Continued)

FOREIGN PATENT DOCUMENTS

JP 2000-35831 2/2000

OTHER PUBLICATIONS

Yasunobu Nakase et al., "Source-Synchronization and Timing Vernier Techniques for 1.2-GB/s SLDRAM Interface", IEEE Journal of Solid-State Circuits, vol. 34, No. 4, Apr. 1999, pp. 494-501.

(Continued)

*Primary Examiner*—John Barlow
*Assistant Examiner*—Demetrius Pretlow
(74) *Attorney, Agent, or Firm*—Hunton & Williams LLP

(57) ABSTRACT

Methods and apparatuses for calibrating out static timing offsets across multiple outputs of a transmitting device are provided. In accordance with at least one embodiment, a signal is selected as the master reference signal, and a closed-loop feedback system is provided to align one or more outputs of the transmitting device to a master reference signal. The master reference signal can be one of the signals being output by the transmitting device, an internal signal that is representative of the desired placement of the edges, or an external signal received by the transmitting device. The signal from the transmitting device is received by a receiver, and a calibration control block is used to generate a control signal to adjust the operation of the transmitting device.

30 Claims, 6 Drawing Sheets

U.S. PATENT DOCUMENTS

| | | | |
|---|---|---|---|
| 6,463,392 B1 * | 10/2002 | Nygaard et al. | 702/89 |
| 6,477,592 B1 * | 11/2002 | Chen et al. | 710/52 |
| 6,510,503 B2 * | 1/2003 | Gillingham et al. | 711/167 |
| 6,516,365 B2 | 2/2003 | Horowitz et al. | |
| 6,549,036 B1 | 4/2003 | Lee | |
| 6,556,934 B2 * | 4/2003 | Highaside | 702/89 |
| 6,583,659 B1 * | 6/2003 | Kwong et al. | 327/295 |
| 6,603,416 B2 * | 8/2003 | Masenas et al. | 341/120 |
| 6,643,787 B1 | 11/2003 | Zerbe et al. | |
| 6,646,953 B1 * | 11/2003 | Stark | 365/233 |
| 6,684,263 B2 | 1/2004 | Horowitz et al. | |
| 6,707,727 B2 * | 3/2004 | Tamura et al. | 365/192 |
| 2001/0005154 A1 * | 6/2001 | Johnson | 327/156 |
| 2001/0056332 A1 * | 12/2001 | Abrosimov et al. | 702/89 |
| 2002/0026613 A1 * | 2/2002 | Niiro | 714/736 |
| 2002/0034271 A1 * | 3/2002 | Heller et al. | 375/350 |
| 2002/0072870 A1 * | 6/2002 | Adam et al. | 702/106 |
| 2002/0138224 A1 * | 9/2002 | Sessions | 702/107 |
| 2003/0131160 A1 | 7/2003 | Hampel et al. | |
| 2003/0179027 A1 * | 9/2003 | Kizer et al. | 327/158 |
| 2003/0201841 A1 * | 10/2003 | Gauthier et al. | 331/185 |
| 2003/0208707 A9 | 11/2003 | Zerbe et al. | |
| 2004/0054845 A1 * | 3/2004 | Ware et al. | 711/100 |
| 2004/0076192 A1 | 4/2004 | Zerbe et al. | |
| 2004/0098634 A1 | 5/2004 | Zerbe et al. | |

OTHER PUBLICATIONS

Lluis Paris et al., "A 800MB/s 72Mb SLDRAM with Digitally-Calibrated DLL", Feb. 1999 IEEE International Solid State Circuites Conference, 10 pages.

"SLD4M18DR400 4 MEG×18 SLDRAM", SLDRAM Inc., Draft/Advance, Jul. 1998, pp. 1-69.

Peter Gillingam et al., "SLDRAM: High-Performance, Open-Standard Memory", IEEE, Nov./Dec. 1997, pp. 29-39.

* cited by examiner

METHOD AND APPARATUS FOR CALIBRATING STATIC TIMING OFFSETS ACROSS MULTIPLE OUTPUTS

FIELD OF THE DISCLOSURE

The invention relates generally to transmission of electrical signals using multiple outputs and more particularly to temporal alignment of signals across multiple outputs.

BACKGROUND

Output drivers in transmitting devices have edge placement inaccuracies due to static timing offsets and dynamic timing errors. Static timing offsets are caused, for example, by transistor mismatches, skew in the clock distribution tree, unequal parasitics, slew rate variation between pull-up and pull-down circuits, packaging differences, etc. Dynamic timing errors are caused, for example, by intersymbol interference (ISI), simultaneous switching output (SSO) noise, clock jitter, etc. Due to the above effects, transmitting devices with multiple outputs have pin-to-pin skew. This skew or misalignment in the outputs significantly contributes to the overall timing inaccuracy of a system utilizing the outputs and therefore reduces the maximum frequency at which the interconnection can operate. This pin-to-pin skew also limits the production yield of the transmitting device, as devices having excessive skew may be unacceptable for use. Thus, a method and apparatus for reducing the pin-to-pin skew is needed to allow increased performance, including operation at higher frequencies, and increased production yields.

DETAILED DESCRIPTION

Figure 1:
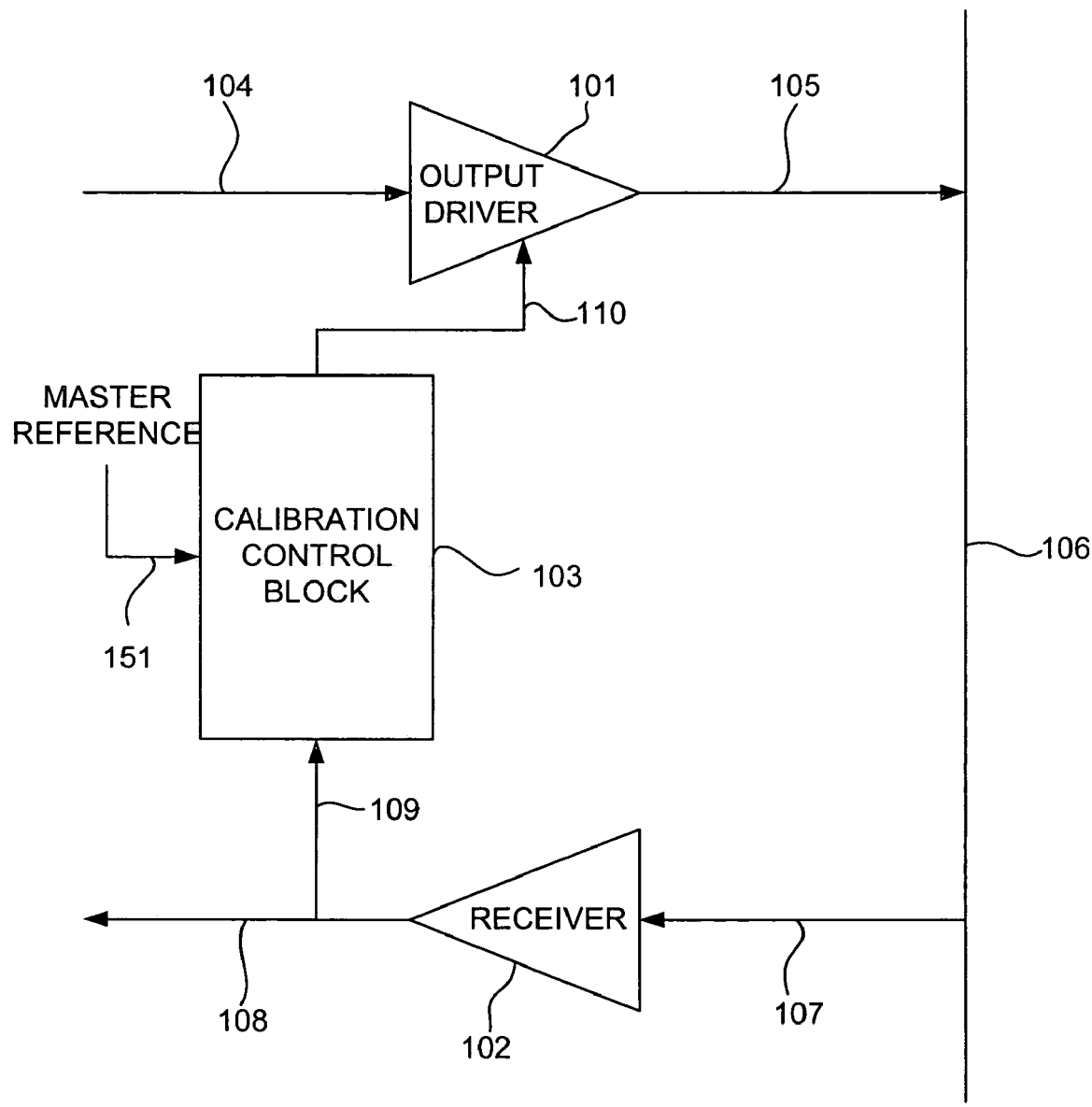
FIG. 1 is a block diagram illustrating an apparatus in accordance with an embodiment of the invention.

Methods and apparatuses for reducing static timing offsets across multiple outputs of a transmitting device are provided. In a preferred embodiment, the static timing offsets are minimized and differences between the static timing offsets are eliminated. In accordance with at least one embodiment, a signal is selected as the master reference signal, and a closed-loop feedback system is provided to align one or more outputs of the transmitting device to a master reference signal. The master reference signal can be one of the signals being output by the transmitting device, an internal signal that is representative of the desired placement of the edges, or an external signal received by the transmitting device. All or a plurality of the outputs may share a common master reference signal, or one or more outputs may have one or more different master reference signals.

The transmitting device is designed to have one or more receivers such that the signals being transmitted are simultaneously being received by the transmitting device. For example, if the transmitting device is coupled to a conductor intended for bi-directional operation (e.g., both transmission and reception), then the transmitting device is already provided with a receiver associated with each output. As another example, if the transmitting device is not already provided with a receiver associated with each outputs, such receivers can readily be added. The signal detected by the receiver is input to a circuit, such as a flip-flop, capable of detecting the phase of the detected signal relative to the master reference signal. In the example of a transmitting device coupled to a conductor intended for bi-directional operation, the phase-detecting circuit may be configured to selectively detect the phase of the detected signal relative to the master reference signal or to a receive clock signal.

The output of the flip-flop, over time, will provide a series of bits. If the transmitted signal, over time, includes an equal number of 1's and 0's and is aligned with the master reference signal, then the output of the flip-flop will contain an equal number of 1's and 0's. This phenomenon can occur, for example, because dynamic errors will cause the output to jitter around some nominal place. If the transmitted signal is systematically mis-aligned with the master reference, then the output of the flip-flop will have unequal numbers of 1's and 0's. The output of the flip-flop is low-pass filtered (using an up/down counter, for example) and then fed back to the output driver.

The output driver is designed such that this "error" signal from the low-pass filter will adjust some characteristic of the driver in order to minimize the error signal. The error signal may change the drive strength of the output driver, the slew rate of the output signal, a variable delay circuit in the path of the output signal, or some other similar mechanism.

If the output driver uses a push-pull arrangement, then the output of the flip-flop can be sent to one of the two low-pass filters depending on whether the edge is rising or falling. The output of the flip-flop associated with the rising edges can be used to adjust some characteristic of the pull-up circuit, and the output of the flip-flop associated with the falling edges can be used to adjust some characteristic of the pull-down circuit.

Since static timing offsets change slowly with respect to time, a transmitting device may be designed to periodically or intermittently go into an auto-calibration mode for a pre-determined period of time and provide calibration of the static timing offsets. Such an approach can be used to minimize power consumed to perform such calibration. As another example, calibration can be performed during normal operation, avoiding the need for dedicated calibration cycles or operations.

By providing reduction of pin-to-pin skew of a transmitting device, both the production yield and the maximum operating frequency of the transmitting device can be increased. By providing reduction of pin-to-pin skew with a minimal amount of additional circuitry, cost and complexity can be minimized.

As one example, at least one embodiment may be practiced with a receiver having multiple voltage thresholds and/or a voltage-based control signal may be used to control the operation of one or more output drivers. When the device is transmitting, the receivers are enabled so that the device may monitor its transmitted output. The receiver has two voltage thresholds, VIL and VIH. If the transmitted output is below VIL, it is recognized as a logic low state and if the transmitted output is above VIH, it is recognized as a logic high state. The outputs of the receivers are connected to flip-flops which are clocked by either a receive clock signal (used during normal receive operation) or the master reference signal (used during transmit operation).

In some cases, such as the case where the output driver is an open-drain buffer, it may be the case that it is easier to control the timing of the falling edges than the timing of the rising edges or the timing of the rising edges rather than the timing of the falling edges. For example, it is possible that the output driver has a static timing offset that makes it consistently late compared to the master reference. The output driver also has dynamic timing errors that make the falling edges jitter around a midpoint time. This jitter may be assumed to occur as a normal probability distribution centered on the midpoint time.

If the receiver were an idealized receiver having zero propagation delay and if the output were to be perfectly aligned with the master reference (on a static or relatively long-term basis), it would be at the center of its swing (between VIL and VIH) every time the receiver flip-flop samples the receiver output using the master reference as the clock. If the receiver has a finite propagation delay, then an amount of static timing offset equal to that propagation delay will be added to each output. Optionally, the timing of the master reference signal can be adjusted to reduce or eliminate this added static timing offset. The dynamic timing error will cause the transmitted output to jitter around its nominal position. Thus, an equal number of logic 1's (logic high states) and logic 0's (logic low states) will be detected by the receiver and the receive flip-flop. This stream of 1's and 0's, when passed through a low pass filter, can be used to produce a DC or low frequency voltage signal, which may be referred to as VMID, which may vary in response to the timing errors detected.

If the transmitted output was always late compared to the master reference signal due to static timing offsets, the receiver will detect more 1's than 0's on the edges of the master reference. Consequently, the output of the low pass filter will be more than VMID. If the transmitted output was always early compared to the master reference signal due to static timing offsets, the receive flip-flop would clock in more 0's than 1's, and the output of the low pass filter would be less than VMID.

The output of the low pass filter is a control signal that indicates the sign (early or late) and the magnitude of the static timing offset associated with an output driver compared to the master reference signal. This control signal can then be used to adjust the characteristics of the output driver such that a closed loop exists that acts to make the timing error represented by the control signal go to zero. As one example, the adjustment of the output driver may involve changing a variable delay between the transmit flip-flop and the output driver. As another example, the adjustment of the output driver may involve changing the slew rate of the output driver. As another example, the adjustment of the output driver may involve changing a drive strength (e.g., adding or subtracting current) of the output driver.

FIG. 1 is a block diagram illustrating an apparatus in accordance with an embodiment of the invention. The apparatus comprises an output driver 101, a receiver 102, and a calibration control block 103. Data to be transmitted are provided to input 104 of output driver 101. Output driver 101 provides an output signal at output 105, which is coupled to conductor 106, which may, for example, be a wire or individual conductor of a bus, such as a bus that carries signals from the apparatus illustrated in FIG. 1 to a circuit located elsewhere that is intended to receive the signal transmitted by output driver 101. Input 107 of receiver 102 is coupled to conductor 106. Thus, while the signal transmitted by output driver 101 is intended for reception at a remote receiver of the circuit located elsewhere, and while receiver 102 is capable of and intended for receiving an incoming signal from a circuit located elsewhere, receiver 102 is nonetheless capable of receiving the signal transmitted by output driver 101.

Receiver 102 provides a received signal at output 108, which is coupled to input 109 of calibration control block 103. Calibration control block 103 receives a master reference signal at master reference input 151. Calibration control block 103 outputs a control signal at control output 110 to output driver 101.

By sampling the received signal with reference to the master reference signal, the calibration control block 103 can assess the temporal accuracy of the output signal generated by output driver 101 relative to the master reference signal. Based on such an assessment, the calibration control block 103 provides the control signal to output driver 101, causing output driver 101 to adjust its output signal to more closely conform to the optimal timing for the output signal.

Figure 2:
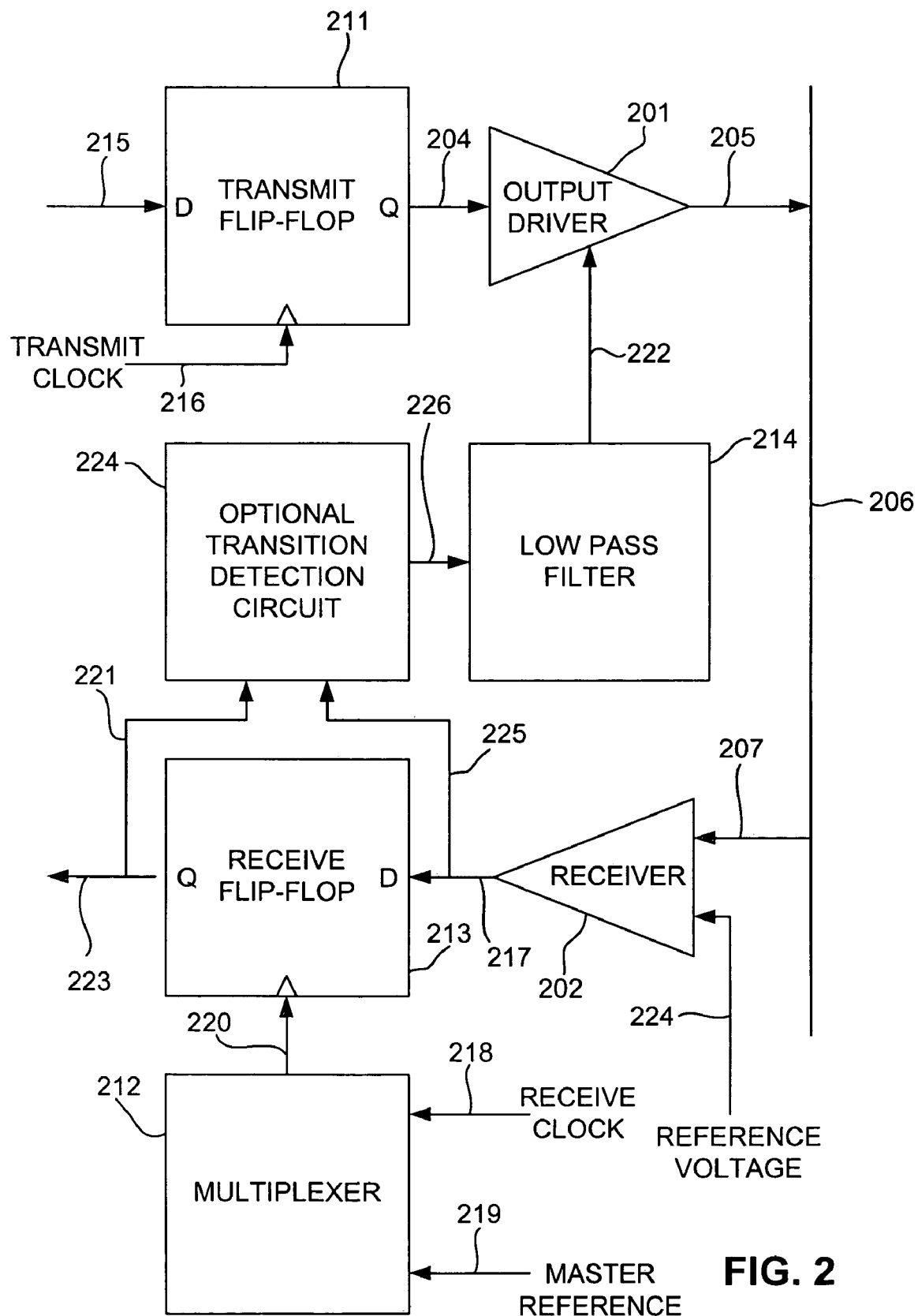
FIG. 2 is a detailed block diagram illustrating an apparatus in accordance with an embodiment of the invention.

FIG. 2 is a detailed block diagram illustrating an apparatus in accordance with an embodiment of the invention. The apparatus of FIG. 2 comprises transmit flip-flop 211, output driver 201, receiver 202, multiplexer 212, receive flip-flop 213, and low pass filter 214. Transmit flip-flop 211 receives an input signal from input 215. Transmit flip-flop 211 receives a transmit clock signal at transmit clock input 216 and uses it to clock data through to input 204, where it provides a transmit signal to output driver 201. Output driver 201 receives the transmit signal from input 204 and provides an output signal at output 205, which is coupled to conductor 206. Conductor 206 may, for example, be a wire or an individual conductor of a bus. An input 207 of receiver 202 is coupled to conductor 206 and receives the output signal from output driver 201. A reference voltage may be provided to receiver 202 at reference input 224 for receiver 202 to use in receiving the output signal.

Receiver 202 provides a received signal at output 217. Receive flip-flop 213 receives the received signal at output 217. Multiplexer 212 receives a receive clock signal at receive clock input 218 and a master reference signal at master reference input 219. A selection signal is applied to a selection input of multiplexer 212 to select among the receive clock signal and the master reference signal and to provide a selected clock signal at clock output 220. For example, the receive clock signal may be selected when receiver 202 is receiving a signal from an external output driver, such as an output driver of another circuit to which conductor 206 is connected, while the master reference signal may be selected when the receiver 202 is receiving an output signal from output driver 201.

Receive flip-flop 213 receives the selected clock signal and uses it to clock data through to its output 223, which is coupled to input 221 of optional transition detection circuit 224. Optional transition detection circuit 224 provides detection of transitions, such as rising edges (e.g., low-to-high transitions) or falling edges (e.g., high-to-low transitions), present at input 221. Optional transition detection circuit 224 also preferably includes an input 225 obtained from output 217. As an example, optional transition detection circuit may be implemented so as to compare logic levels at input 221 and/or input 225 to each other or to logic level references (e.g., a fixed high level logic reference and a fixed low level logic reference) to distinguish the types of transitions. While optional transition detection circuit 224 may be present in certain embodiments of the invention, it may be omitted from certain other embodiments, for example, if rising edges or falling edges can be uniquely identified and processed in another manner or if numbers of 1's and 0's occurring over time are known to be equal or close to equal. If optional transition detection circuit 224 is provided, it provides an output signal to input 226 of low pass filter 214. If not, low pass filter 214 may be provided with an input obtained, for example, from output 223. Low pass filter 214 provides a control signal to output driver 201 at control output 222. Low pass filter 214 need not be what is usually considered to be a low pass filter, but may be a device capable of averaging or integrating signals it receives or otherwise canceling out immediate variations to observe longer term trends. For example, low pass filter 214 may be implemented using a counter that is incremented for one binary value, such as a binary 1 value, and decremented for another binary value, such as a binary 0 value. The value of the counter can be used to generate the control signal provided to output driver 201.

The low pass filter may be implemented with other types of devices, for example, a device that outputs a signal, such as a voltage or current, that varies with a ratio of the numbers of samples received at input 221 having different values. Thus, when receive flip-flop 213 is being clocked using the master reference signal, if low pass filter 214 indicates an excessive relative number of binary 0 values, low pass filter 214 can adjust the control signal at control output 222 to adjust the output timing of output driver 201 to correct timing inaccuracies. Likewise, if low pass filter 214 indicates an excessive relative number of binary 1 values, low pass filter 214 can adjust the control signal at control output 222 to adjust the output timing of output driver 201 to correct timing inaccuracies.

As another example of an apparatus to accurately assess the timing of signals representing data having unequal numbers of different logic states (e.g., binary 0 values and binary 1 values) or ratios of numbers of different logic states that might skew their comparison in low pass filter 214, a comparison can be performed between samples of the received data clocked according to the master reference signal and a known specimen of the data being transmitted, which may, for example, be obtained from the transmit signal at input 204. As another example, such a known specimen of the data being transmitted may be obtained by providing another receive flip-flop clocked with the master reference signal while receive flip-flop 213 is clocked with the receive clock signal. In that case, low pass filter 214 can compare the outputs of the two receive flip-flops that are clocked differently so as determine whether transitions in the output signal on conductor 206 are occurring early or late with respect to the master reference signal. As yet another example, signals representing data having unequal numbers of different logic states or ratios of numbers of different logic states may be encoded using an encoding scheme, such as Manchester encoding, bipolar 8 zero substitution (B8ZS), high density bipolar 3 (HDB3), or zero code suppression (ZCS), to ensure the presence of a certain number of transitions regardless of the actual data represented by the signals. Alternatively, a high-transition-density pattern, for example, a test pattern in addition to the data intended to be transmitted, may be explicitly transmitted to facilitate timing offset calibration. Such a test pattern may be transmitted as part of an initialization routine before the data intended to be transmitted is transmitted or may be transmitted occasionally between transmissions of the data intended to be transmitted.

To prevent misidentification of signals representing data having unequal numbers of different logic states or ratios of numbers of different logic states with systematic temporal misalignment of those signals with a master reference signal, low pass filter 214 can be provided with indications of occurrences of rising edges and falling edges. For example, inputs and outputs of a transmit flip-flop or a receive flip-flop may be compared (e.g., using an AND gate with an inverter on one of its inputs or other combinational logic) to detect the occurrence of a rising edge or falling edge and provide such an indication. Alternatively, an analog circuit, such as differentiator circuit, may be used to identify such transitions and provide such an indication.

Figure 3:
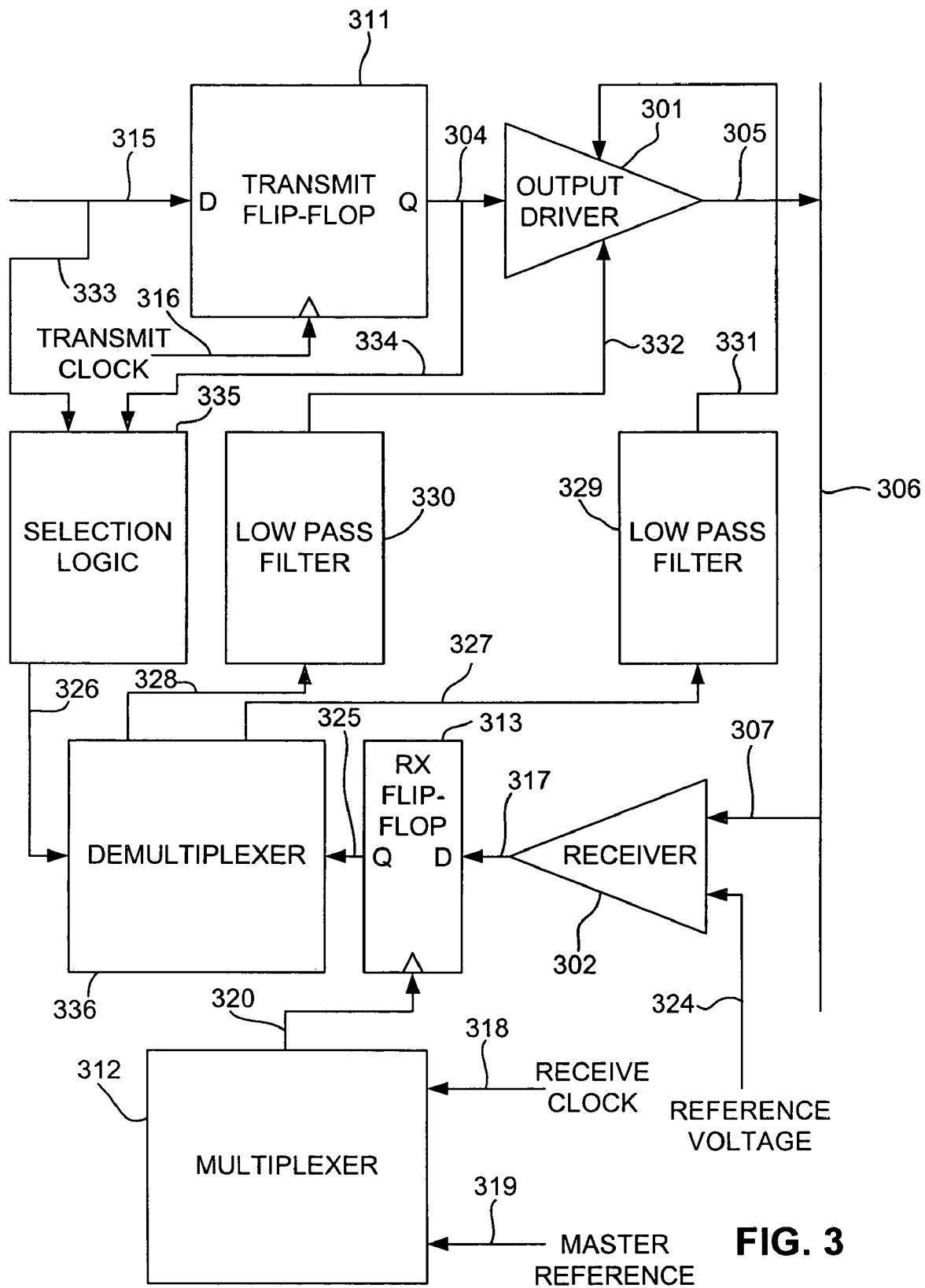
FIG. 3 is a detailed block diagram illustrating an apparatus providing a capability of separate calibration for positive transitions and negative transitions in accordance with an embodiment of the invention.

FIG. 3 is a detailed block diagram illustrating an apparatus providing a capability of separate calibration for positive transitions and negative transitions in accordance with an embodiment of the invention. For example, such an apparatus is useful for independently adjust the pull-up section and the pull-down section of an output buffer that uses a push-pull (or totem-pole) arrangement and may also minimize static timing offsets due to the mismatches in the p-channel metal oxide semiconductor (PMOS) and n-channel metal oxide semiconductor (NMOS) transistors in the output driver. The apparatus of FIG. 3 comprises transmit flip-flop 311, output driver 301, receiver 302, multiplexer 312, receive flip-flop 313, selection logic 335, demultiplexer 336, low pass filter 329, and low pass filter 330. Transmit flip-flop 311 receives an input signal from input 315. Transmit flip-flop 311 receives a transmit clock signal at transmit clock input 316 and uses it to clock data through to input 304, where it provides a transmit signal to output driver 301. Output driver 301 receives the transmit signal from input 304 and provides an output signal at output 305, which is coupled to conductor 306. Conductor 306 may, for example, be a wire or an individual conductor of a bus. An input 307 of receiver 302 is coupled to conductor 306 and receives the output signal from output driver 301. A reference voltage may be provided to receiver 302 at reference input 324 for receiver 302 to use in receiving the output signal.

Receiver 302 provides a received signal at output 317. Receive flip-flop 313 receives the received signal at output 317. Multiplexer 312 receives a receive clock signal at receive clock input 318 and a master reference signal at master reference input 319. A selection signal is applied to a selection input of multiplexer 312 to select among the receive clock signal and the master reference signal and to provide a selected clock signal at clock output 320. For example, the receive clock signal may be selected when receiver 302 is receiving a signal from an external output driver, such as an output driver of another circuit to which conductor 306 is connected, while the master reference signal may be selected when the receiver 302 is receiving an output signal from output driver 301.

Receive flip-flop 313 receives the selected clock signal and uses it to clock data through to its output 325, which is coupled to demultiplexer 336. Input 315 is coupled to input 333 of selection logic 335. Input 304 is coupled to input 334 of selection logic 335. Thus, selection logic 335 is preferably aware of the current bit transmitted and the next bit to be transmitted. Based on these inputs, selection logic 335 is able to determine if a rising edge or a falling edge will be transmitted in the next bit time. Selection logic 335 provides a selection signal to demultiplexer 336 via selection input 326. This selection signal may, for example, indicate whether a rising edge or a falling edge will be present in the transmitted signal. Based on the selection signal, demultiplexer 336 provides an output to input 327 of low pass filter 329 or input 328 of low pass filter 330. If selection logic 335 detects that the current bit transmitted and the next bit to be transmitted are of the same logic level, it can disable the output of demultiplexer 336. This feature can be used to ensure that only transitions are used to measure and calibrate the static timing offsets. Thus, low pass filters 329 and 330 can be used to separately provide correction for different types of timing inaccuracies.

For example, low pass filter 329 can be used to provide correction for timing inaccuracies relating to rising edges, while low pass filter 330 can be used to provide correction for timing inaccuracies relating to falling edges. Low pass filter 329 provides a control signal to output driver 301 at control output 331. Low pass filter 330 provides a control signal to output driver 301 at control output 332. Thus, low pass filters 329 and 330 can adjust the control signals at control outputs 331 and 332 to adjust the output timing of output driver 301 to correct timing inaccuracies for rising edges and falling edges, respectively. The control output of the low pass filter associated with rising edges is used to adjust some characteristic of the pull-up section of the output driver. The control output of the low pass filter associated with falling edges is used to adjust some characteristic of the pull-down section of the output driver. Thus, timing inaccuracies that affect rising and falling edges differently, for example, timing inaccuracies arising from differences in the properties of NMOS and PMOS transistors, can be corrected.

Figure 4:
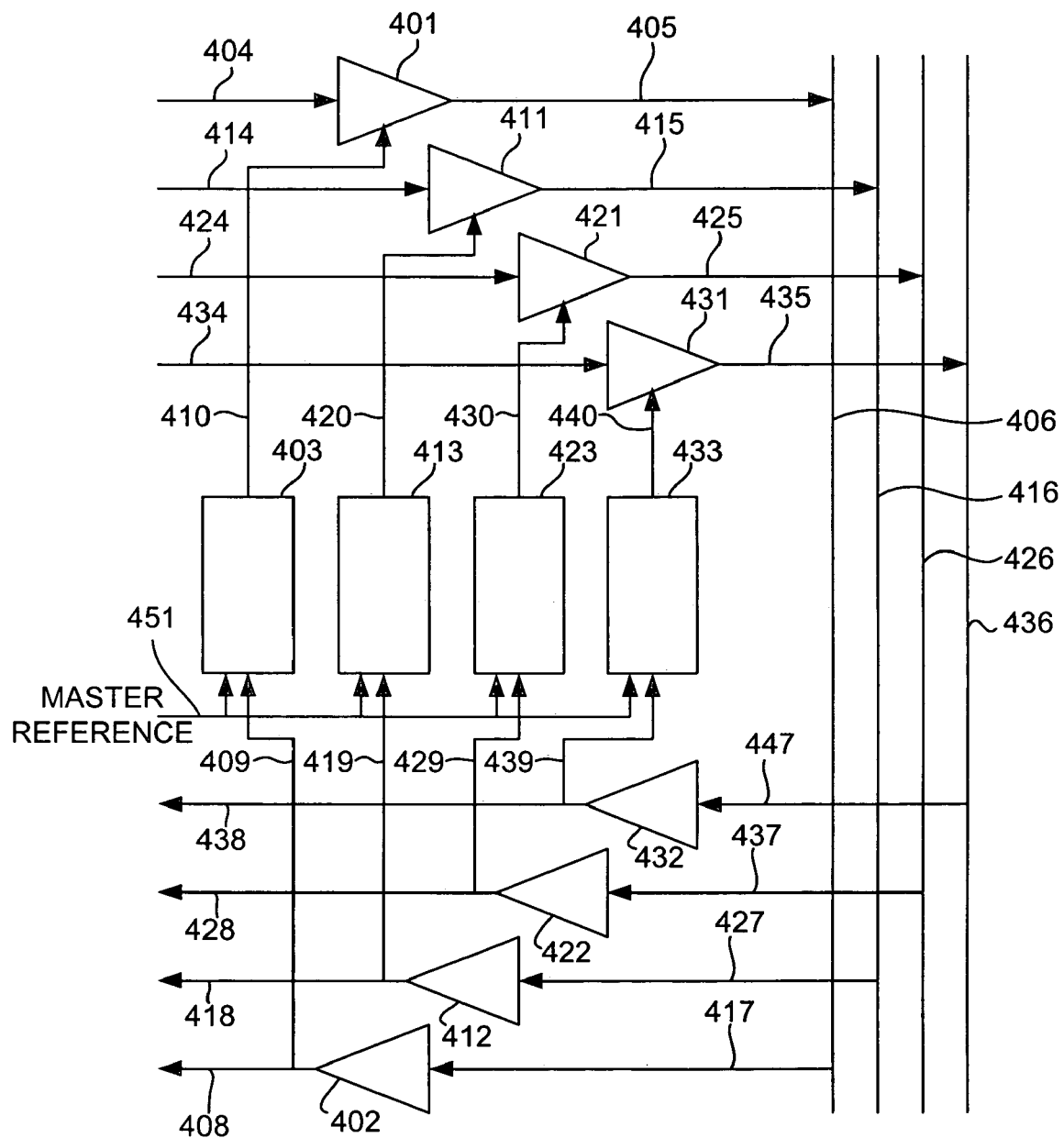
FIG. 4 is a block diagram illustrating an apparatus configured to accommodate multiple outputs in accordance with an embodiment of the invention.

FIG. 4 is a block diagram illustrating an apparatus configured to accommodate multiple outputs in accordance with an embodiment of the invention. The apparatus of FIG. 4 comprises output drivers 401, 411, 421, and 431, receivers 402, 412, 422, and 432, and calibration control blocks 403, 413, 423, and 433. Output drivers 401, 411, 421, and 431, receive data to be transmitted at inputs 404, 414, 424, and 434 to produce output signals at outputs 405, 415, 425, 435, respectively. Outputs 405, 415, 425, and 435 are coupled to conductors 406, 416, 426, and 436, respectively. Conductors 406, 416, 426, and 436 are coupled to inputs 417, 427, 437, and 447 of receivers 402, 412, 422, and 432, respectively. Receivers 402, 412, 422, and 432 produce outputs 408, 418, 428, and 438, which are coupled to inputs 409, 419, 429, and 439 of calibration control blocks 403, 413, 423, and 433, respectively. Each of calibration control blocks 403, 413, 423, and 433 receives a master reference signal at master reference input 451. In a preferred embodiment, master reference input 451 is configured such that the times of arrival of a single master reference signal at each of calibration control blocks 403, 413, 423, and 433 are closely aligned. Calibration control blocks 403, 413, 423, and 433 provide control signals to output drivers 401, 411, 421, and 431 via control outputs 410, 420, 430, and 440, respectively.

Figure 5:
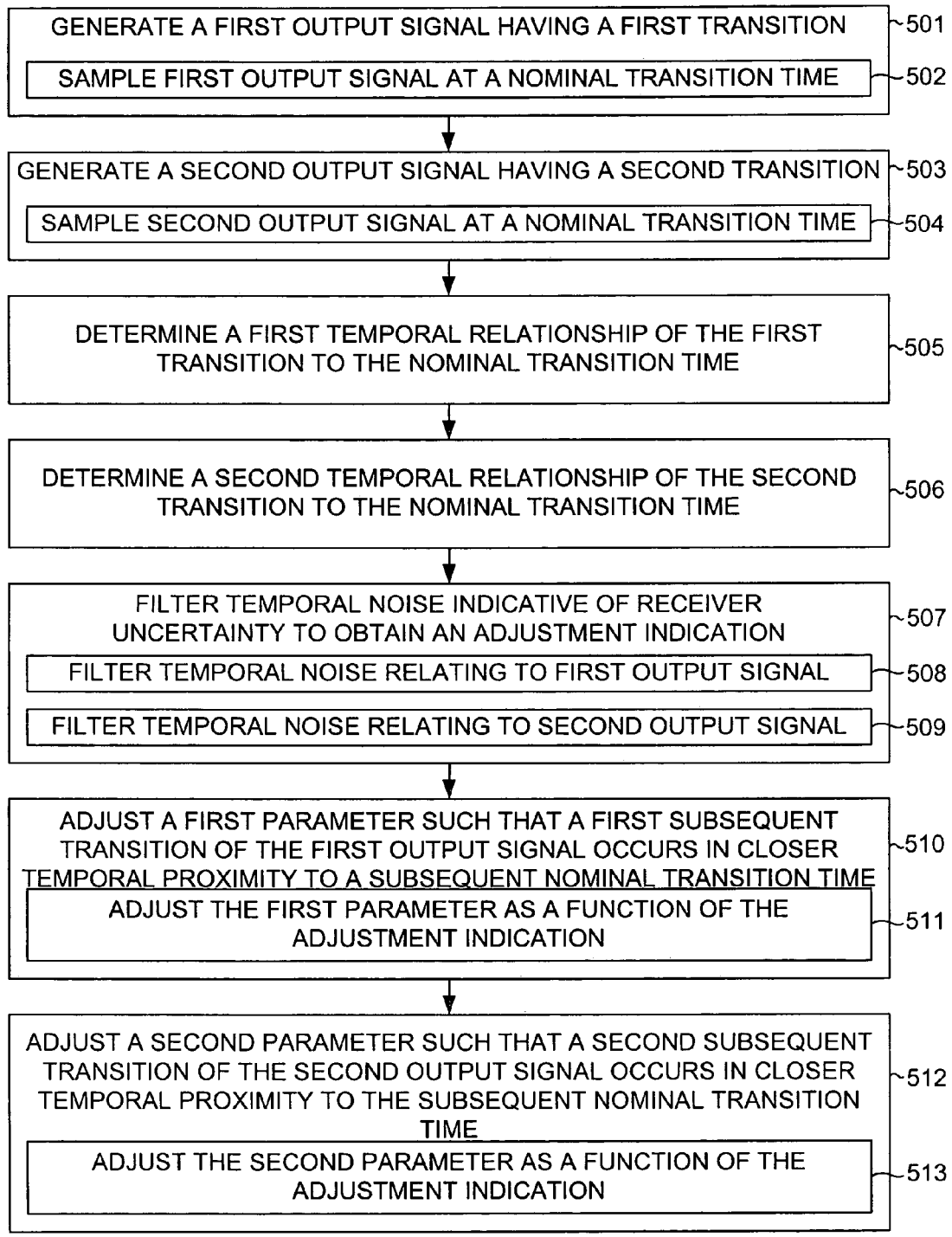
FIG. 5 is a flow diagram illustrating a method in accordance with an embodiment of the invention.

FIG. 5 is a flow diagram illustrating a method in accordance with an embodiment of the invention. The method begins in step 501, where a first output signal having a first transition is generated. Step 501 may include step 502. In step 502, the first output signal is sampled at a nominal transition time. From step 501, the method continues in step 503.

In step 503, a second output signal having a second transition is generated. Step 503 may include step 504. In step 504, the second output signal is sampled at a nominal transition time. From step 504, the method continues in step 505. In step 505, a first temporal relationship of the first transition to the nominal transition time is determined. From step 505, the method continues in step 506. In step 506, a second temporal relationship of the second transition to the nominal transition time is determined. From step 506, the method continues in step 507.

In step 507, temporal noise indicative of receiver uncertainty is filtered to obtain an adjustment indication. Step 507 may include steps 508 and 509. In step 508, temporal noise relating to the first output signal is filtered. In step 509, temporal noise relating to the second output signal is filtered. From step 507, the method continues in step 510. In step 510, a first parameter is adjusted such that a first subsequent transition of the first output signal occurs in closer temporal proximity to a subsequent nominal transition time. Step 510 may include step 511. In step 511, the first parameter is adjusted as a function of the adjustment indication. From step 511, the method continues at step 512. In step 512, a second parameter is adjusted such that a second subsequent transition of the second output signal occurs in closer temporal proximity to the subsequent nominal transition time. Step 512 may include step 513. In step 513, the second parameter is adjusted as a function of the adjustment indication.

Figure 6:
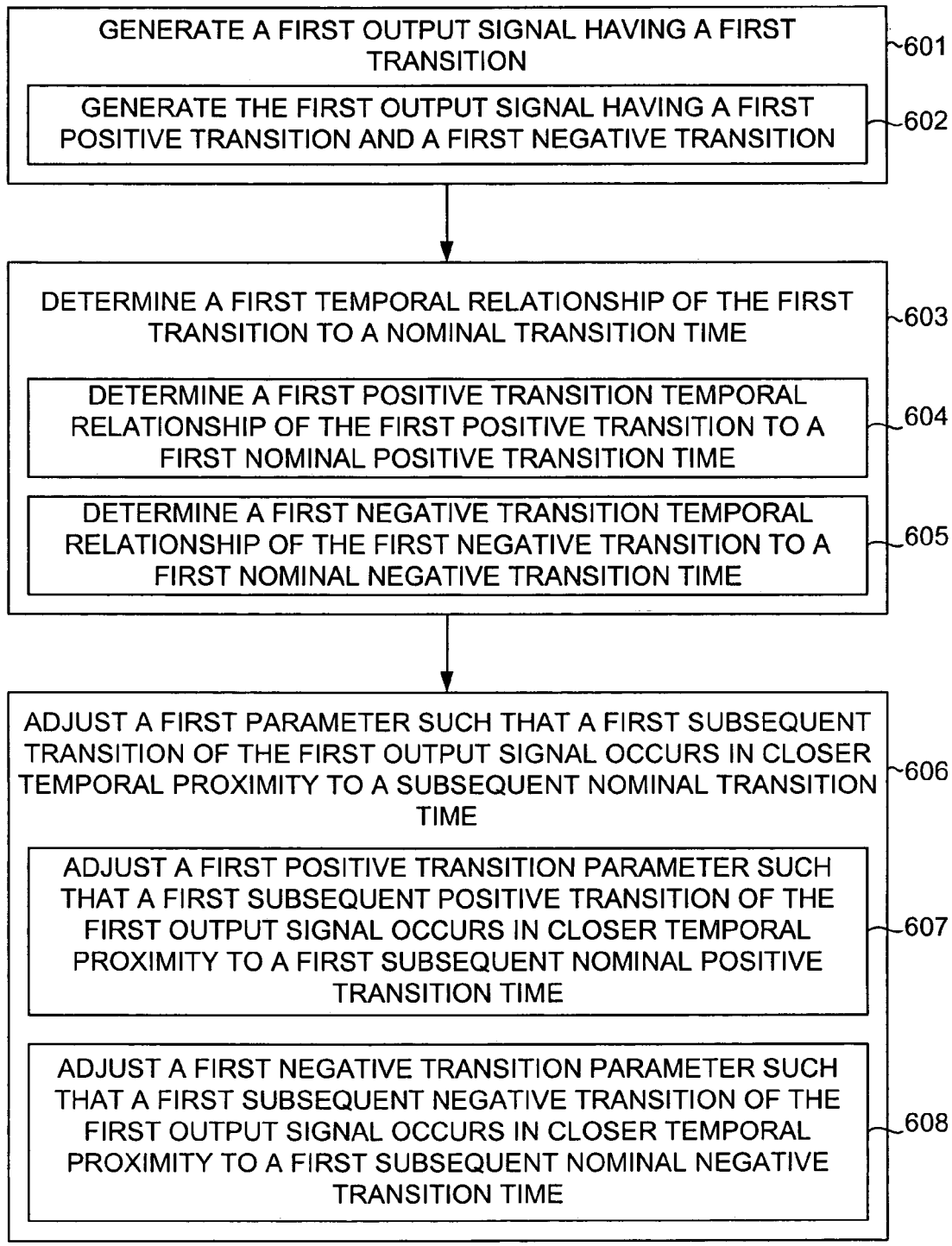
FIG. 6 is a flow diagram illustrating a method in accordance with an embodiment of the invention.

FIG. 6 is a flow diagram illustrating a method in accordance with an embodiment of the invention. The method begins in step 601. In step 601, a first output signal having a first transition is generated. Step 601 may include step 602. In step 602, the first output signal having a first positive transition and a first negative transition is generated. From step 602, the method continues in step 603.

In step 603, a first temporal relationship of the first transition to a nominal transition time is determined. Step 603 may include steps 604 and 605. In step 604, a first positive transition temporal relationship of the first positive transition to a first nominal positive transition time is determined. In step 605, a first negative transition temporal relationship of the first negative transition to a first nominal negative transition time is determined.

From step 603, the method continues in step 606. In step 606, a first parameter is adjusted such that a first subsequent transition of the first output signal occurs in closer temporal proximity to a subsequent nominal transition time. Step 606 may include steps 607 and 608. In step 607, a first positive transition parameter is adjusted such that a first subsequent positive transition of the first output signal occurs in closer temporal proximity to a first subsequent nominal positive transition time. In step 608, a first negative transition parameter is adjusted such that a first subsequent negative transition of the first output signal occurs in closer temporal proximity to a first subsequent nominal negative transition time.

The term "closer" as used above refers to temporal proximity as compared with the temporal relationships previously determined. For example, in step 606, the first subsequent transition of the first output signal occurs in closer temporal proximity to the subsequent nominal transition time than the first temporal relationship of the first transition to the nominal transition time of step 603.

By calibrating out only the static timing offsets, the calibration need not be adjusted for every transmit operation. Rather, the calibration method may be performed or the calibration apparatus enabled intermittently or periodically for brief periods of time in order to calibrate out static timing offsets that may change, for example, with process, voltage, and temperature. As another example, the method or apparatus may perform the calibration only once during a power-up or reboot initialization sequence. As yet another example, the method or apparatus may perform the calibration on a regular or continuous basis during operation.

Various embodiments of the present invention may be applied to a variety of systems wherein data are transmitted from one device to another device. For example, memory systems communicate data between memory devices and a device connected to the memory devices, such as a memory controller. Embodiments of the invention may be practiced within either or both of the memory devices and the memory controller. As another example, other integrated circuits often communicate data with each other. To illustrate this, a central processing unit (CPU) typically has a bus, such as a front-side bus, to communicate with other integrated circuits. Embodiments of the invention may be practiced within a CPU or within other integrated circuits. As yet another example, network interface circuits, such as ethernet circuits often communicate data in a manner to which embodiments of the present invention may be applied. As a further example, a very high-speed serializer-deserializer (serdes) could benefit from the application of embodiments of the present invention.

While certain aspects described above have been expressed in terms of particular semiconductor technologies, such as NMOS or PMOS, it should be understood that the invention is not limited to specific semiconductor technologies, but may be practiced with any type of semiconductor technology, for example, complementary metal oxide semiconductor (CMOS) technology, bipolar semiconductor technology, or other semiconductor technologies.

Accordingly, a method and apparatus for calibrating static timing offsets across multiple outputs has been described. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for calibrating static timing offsets across multiple outputs comprising the steps of:
   generating a first output signal having a first transition;
   determining a first temporal relationship of the first transition to a reference transition time by sampling the first output signal at the reference transition time;
   adjusting a first parameter, based at least in part upon the first temporal relationship, such that a first subsequent transition of the first output signal occurs in closer temporal proximity to a subsequent reference transition time;
   generating a second output signal having a second transition;
   determining a second temporal relationship of the second transition to the reference transition time by sampling the second output signal at the reference transition time; and
   adjusting a second parameter, based at least in part upon the second temporal relationship, such that a second subsequent transition of the second output signal occurs in closer temporal proximity to the subsequent reference transition time;
   wherein the steps of adjusting the first parameter and adjusting the second parameter reduce a temporal skew between the first subsequent transition of the first output signal and the second subsequent transition of the second output signal.

2. The method of claim 1 further comprising the step of:
   filtering temporal noise indicative of receiver uncertainty to obtain an adjustment indication.

3. The method of claim 2 wherein the step of adjusting a first parameter is performed as a function of the adjustment indication.

4. The method of claim 1 wherein the step of generating the first output signal having the first transition further comprises the step of:
   generating the first output signal having a first positive transition and a first negative transition;
   wherein the step of determining the first temporal relationship of the first transition to the reference transition time further comprises the steps of:
      determining a first positive transition temporal relationship of the first positive transition to a first reference positive transition time; and
      determining a first negative transition temporal relationship of the first negative transition to a first reference negative transition time; and
   wherein the step of adjusting the first parameter such that the first subsequent transition of the first output signal occurs in closer temporal proximity to the subsequent reference transition time further comprises the steps of:
      adjusting a first positive transition parameter such that a first subsequent positive transition of the first output signal occurs in closer temporal proximity to a first subsequent reference positive transition time; and
      adjusting a first negative transition parameter such that a first subsequent negative transition of the first output signal occurs in closer temporal proximity to a first subsequent reference negative transition time.

5. The method of claim 1, wherein the step of determining a first temporal relationship of the first transition to a reference transition time comprises determining a time difference between the first transition and the reference transition time.

6. The method of claim 1, wherein the step of adjusting a first parameter such that a first subsequent transition of the first output signal occurs in closer temporal proximity to a subsequent reference transition time comprises adjusting the first parameter such that the first subsequent transition of the first output signal occurs closer in time to a subsequent reference transition time.

7. The method of claim 1, wherein the first parameter comprises a variable delay between a transmit flip-flop and an output driver.

8. The method of claim 1, wherein the first parameter comprises a slew rate of an output driver.

9. The method of claim 1, wherein the first parameter comprises a drive strength of an output driver.

10. Apparatus for calibrating static timing offsets across multiple outputs comprising:
    a first output driver for generating a first output signal having a first transition;
    a first receiver coupled to the first output driver for receiving the first output signal;
    a first calibration control block coupled to the first receiver and to the first output driver, the first calibration control block for determining a first temporal relationship of the first transition to a nominal transition time and for providing a first adjustment signal to adjust a first timing offset of the first output driver based on the first temporal relationship;
    a second output driver for generating a second output signal having a second transition;

a second receiver coupled to the second output driver for receiving the second output signal; and a second calibration control block coupled to the second receiver and to the second output driver, the second calibration control block for determining a second temporal relationship of the second transition to the nominal transition time and for providing a second adjustment signal to adjust a second timing offset of the second output driver based on the second temporal relationship.

11. The apparatus of claim 10 wherein the first calibration control block and the second calibration control block adjust the first timing offset and the second timing offset, respectively, so as to reduce a temporal skew between subsequent transitions of the first output signal and the second output signal.

12. The apparatus of claim 10 wherein the first calibration control block comprises:
a sampling circuit for sampling the first signal at the nominal transition time.

13. The apparatus of claim 12 wherein the first calibration control block comprises:
a filtering circuit for filtering temporal noise indicative of sampling uncertainty of the sampling circuit.

14. The apparatus of claim 10 wherein the first output signal has a first positive transition and a first negative transition and wherein the first calibration control block further comprises:
a first positive transition filtering circuit for filtering positive transition temporal noise indicative of sampling uncertainty of the sampling circuit related to sampling of positive transitions; and
a first negative transition filtering circuit for filtering negative transition temporal noise indicative of the sampling uncertainty of the sampling circuit related to sampling of negative transitions.

15. The apparatus of claim 14 wherein the first adjustment signal is a first positive transition adjustment signal to adjust a first positive transition timing offset of the first output driver and the first calibration control block further provides a first negative transition adjustment signal to adjust a first negative transition timing offset of the first output driver.

16. The apparatus of claim 10, wherein the nominal transition time comprises a reference transition time.

17. The apparatus of claim 16, wherein the first calibration control block determines a first temporal relationship of the first transition to a nominal transition time by determining a time difference between the first transition and the reference transition time.

18. The apparatus of claim 10, wherein the first adjustment signal is provided to adjust a variable delay between a transmit flip-flop and the first output driver.

19. The apparatus of claim 10, wherein the first adjustment signal is provided to adjust a slew rate of the first output driver.

20. The apparatus of claim 10, wherein the first adjustment signal is provided to adjust a drive strength of the first output driver.

21. A method for calibrating static timing offsets comprising the steps of:
generating a first output signal having a first transition;
determining a first temporal relationship of the first transition to a reference transition time by sampling the first output signal at the reference transition time;
filtering temporal noise indicative of receiver uncertainty to obtain an adjustment indication; and
adjusting a first parameter associated with generating the first output signal, based at least in part upon the first temporal relationship, such that a first subsequent transition of the first output signal occurs in closer temporal proximity to a subsequent reference transition time.

22. The method of claim 21 further comprising the steps of:
generating a second output signal having a second transition;
determining a second temporal relationship of the second transition to the reference transition time by sampling the second output signal at the reference transition time; and
adjusting a second parameter, based at least in part upon the second temporal relationship, such that a second subsequent transition of the second output signal occurs in closer temporal proximity to the subsequent reference transition time.

23. The method of claim 22 wherein the steps of adjusting the first parameter and adjusting the second parameter reduce a temporal skew between the first subsequent transition of the first output signal and the second subsequent transition of the second output signal.

24. The method of claim 21 wherein the step of adjusting a first parameter is performed as a function of the adjustment indication.

25. The method of claim 21 wherein the step of generating the first output signal having the first transition further comprises the step of:
generating the first output signal having a first positive transition and a first negative transition;
wherein the step of determining the first temporal relationship of the first transition to the reference transition time further comprises the steps of:
determining a first positive transition temporal relationship of the first positive transition to a first reference positive transition time; and
determining a first negative transition temporal relationship of the first negative transition to a first reference negative transition time; and
wherein the step of adjusting the first parameter such that the first subsequent transition of the first output signal occurs in closer temporal proximity to the subsequent reference transition time further comprises the steps of:
adjusting a first positive transition parameter such that a first subsequent positive transition of the first output signal occurs in closer temporal proximity to a first subsequent reference positive transition time; and
adjusting a first negative transition parameter such that a first subsequent negative transition of the first output signal occurs in closer temporal proximity to a first subsequent reference negative transition time.

26. The method of claim 21, wherein the step of determining a first temporal relationship of the first transition to a reference transition time comprises determining a time difference between the first transition and the reference transition time.

27. The method of claim 21, wherein the step of adjusting a first parameter such that a first subsequent transition of the first output signal occurs in closer temporal proximity to a subsequent reference transition time comprises adjusting the first parameter such that the first subsequent transition of the first output signal occurs closer in time to a subsequent reference transition time.

28. The method of claim 21, wherein the first parameter comprises a variable delay between a transmit flip-flop and an output driver.

29. The method of claim 21, wherein the first parameter comprises a slew rate of an output driver.

30. The method of claim 21, wherein the first parameter comprises a drive strength of an output driver.

* * * * *